(12) United States Patent
Hargrove et al.

(10) Patent No.: US 8,537,160 B2
(45) Date of Patent: Sep. 17, 2013

(54) GENERATING DISTRIBUTED DATAFLOW GRAPHS

(75) Inventors: Thomas Hargrove, Kirkland, WA (US); Mosha Pasumansky, Redmond, WA (US); Alexander Berger, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 12/042,672

(22) Filed: Mar. 5, 2008

(65) Prior Publication Data

US 2009/0225082 A1  Sep. 10, 2009

(51) Int. Cl.
- G06T 11/20 (2006.01)
- G06F 15/16 (2006.01)
- G06F 15/80 (2006.01)
- G06F 7/00 (2006.01)
- G09G 5/00 (2006.01)

(52) U.S. Cl.
USPC ........... 345/440; 345/502; 345/505; 345/619; 707/791; 707/798

(58) Field of Classification Search
USPC ................ 345/420, 440–443, 501–506, 619, 345/630; 707/602, 610, 615, 616, 619, 626, 707/633–639, 755, 756, 758, 764, 791, 798
See application file for complete search history.

(56) References Cited

U.S. PATENT DOCUMENTS

| | | | | |
|---|---|---|---|---|
| 5,752,241 | A * | 5/1998 | Cohen | 707/713 |
| 6,208,990 | B1 | 3/2001 | Suresh | |
| 7,047,232 | B1 | 5/2006 | Serrano | |
| 7,058,615 | B2 | 6/2006 | Yao | |
| 2005/0055328 | A1 | 3/2005 | Yagawa | |
| 2005/0187991 | A1 | 8/2005 | Wilms | |
| 2005/0256892 | A1 | 11/2005 | Harken | |
| 2007/0214171 | A1 | 9/2007 | Behnen | |
| 2009/0125553 | A1 * | 5/2009 | Dickinson | 707/104.1 |

OTHER PUBLICATIONS

Blythe, "The Direct3D 10 System", 2006, "The Association for Computing Machinery, Inc.", pp. 724-734.*
United Devices, CTH Partner on Distributed Data Warehousing http://www.gridtoday.com/grid/611435.html.
Sybase Data Integration Suite: Harnessing data for faster, higher-quality business intelligence http://www.sybase.com/detail?id=1042270.
Genio(R)—Enterprise Data Integration solution http://connectivity.hummingbird.com/products/nc/genio.html.
Ferner, Clayton S., et al. Automatic Choice of Scheduling Heuristics for Parallel/Distributed Computing http://people.uncw.edu/cferner/papers/SP99.ps.

* cited by examiner

*Primary Examiner* — Wesner Sajous
*Assistant Examiner* — Andrew Shin
(74) *Attorney, Agent, or Firm* — Shook Hardy & Bacon LLP

(57) ABSTRACT

Systems and methods for generating distributed dataflow graphs and processing data elements in parallel utilizing the distributed dataflow graphs are provided. A sequential dataflow graph is formed from incoming data elements, and a variety of heuristics is applied to the sequential dataflow graph to determine which of the data transformation steps within the graph are capable of being processed multiple times in parallel. Once determined, the sequential dataflow graph is divided into subgraphs, which are then replicated, e.g., based on available resources and.or external constraints. The resulting subgraphs are connected, based on the semantics of each vertex, and a distributed dataflow graph is generated, which can efficiently process data elements, for instance, for data warehousing and the like.

20 Claims, 5 Drawing Sheets

GENERATING DISTRIBUTED DATAFLOW GRAPHS

BACKGROUND

As the amount of data requiring storage increases from sources such as online applications, the need for a more efficient processing system also increases. Recently, the use of traditional data extraction, transformation, and loading (ETL) tools has become impractical, time consuming and costly as data is received in increasingly higher volumes. Traditionally, ETL tools have been used in data warehousing projects, or other projects such as data storage in a database, or the like, when the data will later be accessed and analyzed. These existing ETL tools generally require manual intervention and/or are not able to process large volumes of data in parallel, both leading to processing inefficiencies.

SUMMARY

Embodiments of the present invention relate to systems and methods for generating distributed dataflow graphs from sequential dataflow graphs, and for processing data elements in parallel utilizing the distributed dataflow graphs. A variety of heuristics are used to determine which data transformation steps within a particular sequential dataflow graph are capable of being processed multiple times in parallel. Once this is determined, the sequential dataflow graph is divided into subgraphs, which are then replicated. The resulting subgraphs are connected to form a distributed dataflow graph that can efficiently and effectively process data elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

Figure 1:
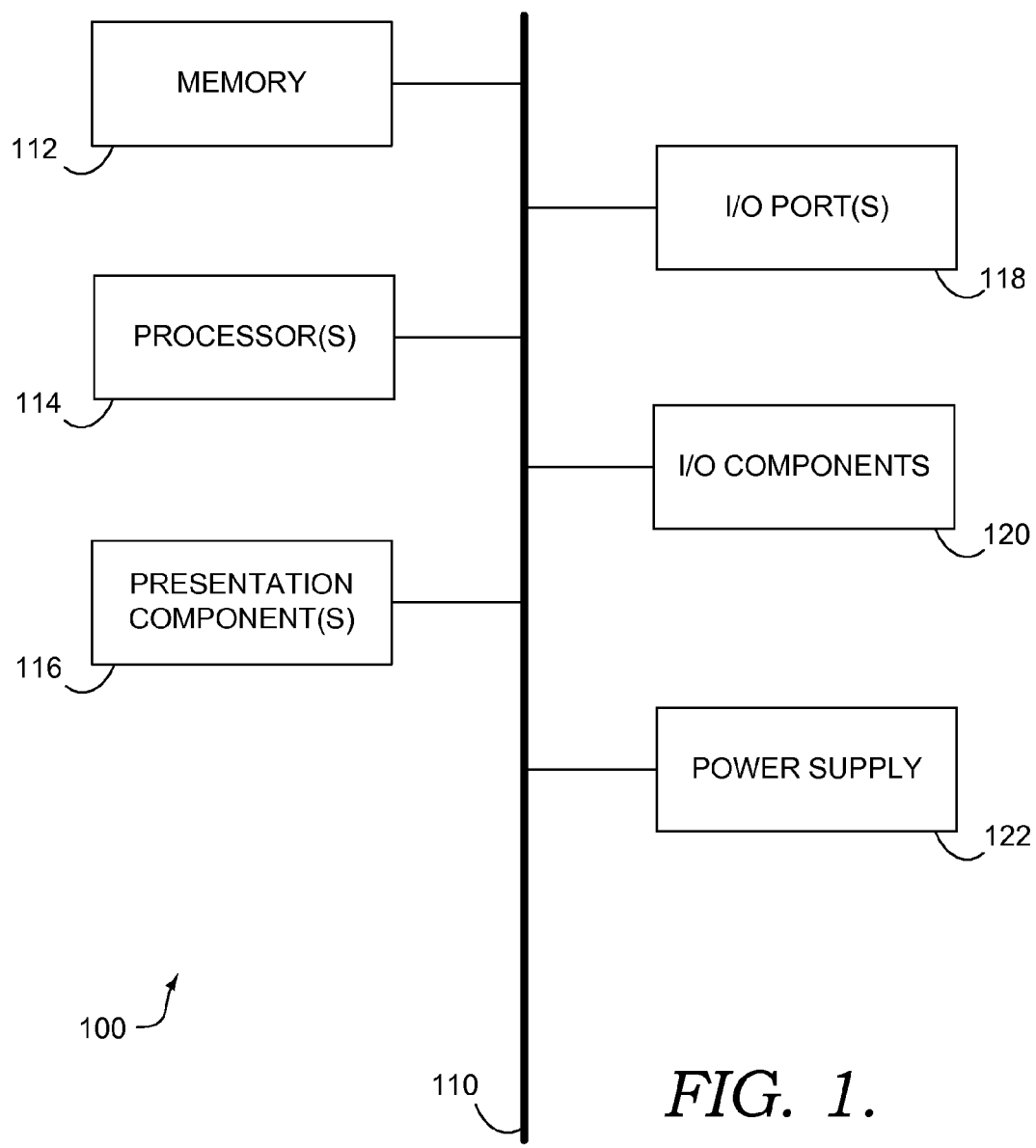
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems and methods for generating distributed dataflow graphs from sequential dataflow graphs, and for processing data elements in parallel utilizing the distributed dataflow graphs. Once a request for a data warehousing project, or the like, is received, data elements are received from any external source, such as a website or other such application. The data is read and parsed in order to form a sequential dataflow graph, that is, a graph indicating sequentially the steps performed in processing incoming data. The sequential dataflow graph is comprised of multiple vertices (i.e., data transformation steps) and edges (i.e., representations of dataflow). The sequential dataflow graph, in one embodiment, is stored as an internal in-memory representation, which allows the graph to be accessible and compatible with data elements in any language. Once the sequential dataflow graph is formed, a variety of heuristics, or algorithms used to solve problems, are applied to the graph in order to determine which of the vertices within a particular sequential dataflow graph are capable of being processed multiple times in parallel, and from this determination, an execution plan is formed. The execution plan, among other things, provides how the sequential dataflow graph will be divided into subgraphs for optimal processing performance. Generally, consecutive vertices that are able to be processed multiple times in parallel and consecutive vertices that must be performed sequentially are grouped with one another to form a subgraph. These subgraphs are replicated according to the execution plan, which can depend on a number of factors, including, but not limited to, the quantity of processors that are available to perform at least one of the vertices, the layout of the data elements, the quantity of the data elements that are formed into the sequential dataflow graph, and user input. The replicated subgraphs are connected according to the semantics of each vertex, and a distributed dataflow graph is generated that can efficiently and effectively process the data elements, e.g., for data warehousing and the like.

Having briefly described an overview of the present invention, an exemplary operating environment for the present invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computer 110 typically includes a variety of computer-readable media. Computer-readable media can be any available media that can be accessed by computer 110 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices, including I/O components 120, some of which may be built in. Illustrative components include a microphone, joystick, game pad, satellite dish, scanner, printer, wireless device, etc.

Figure 2:
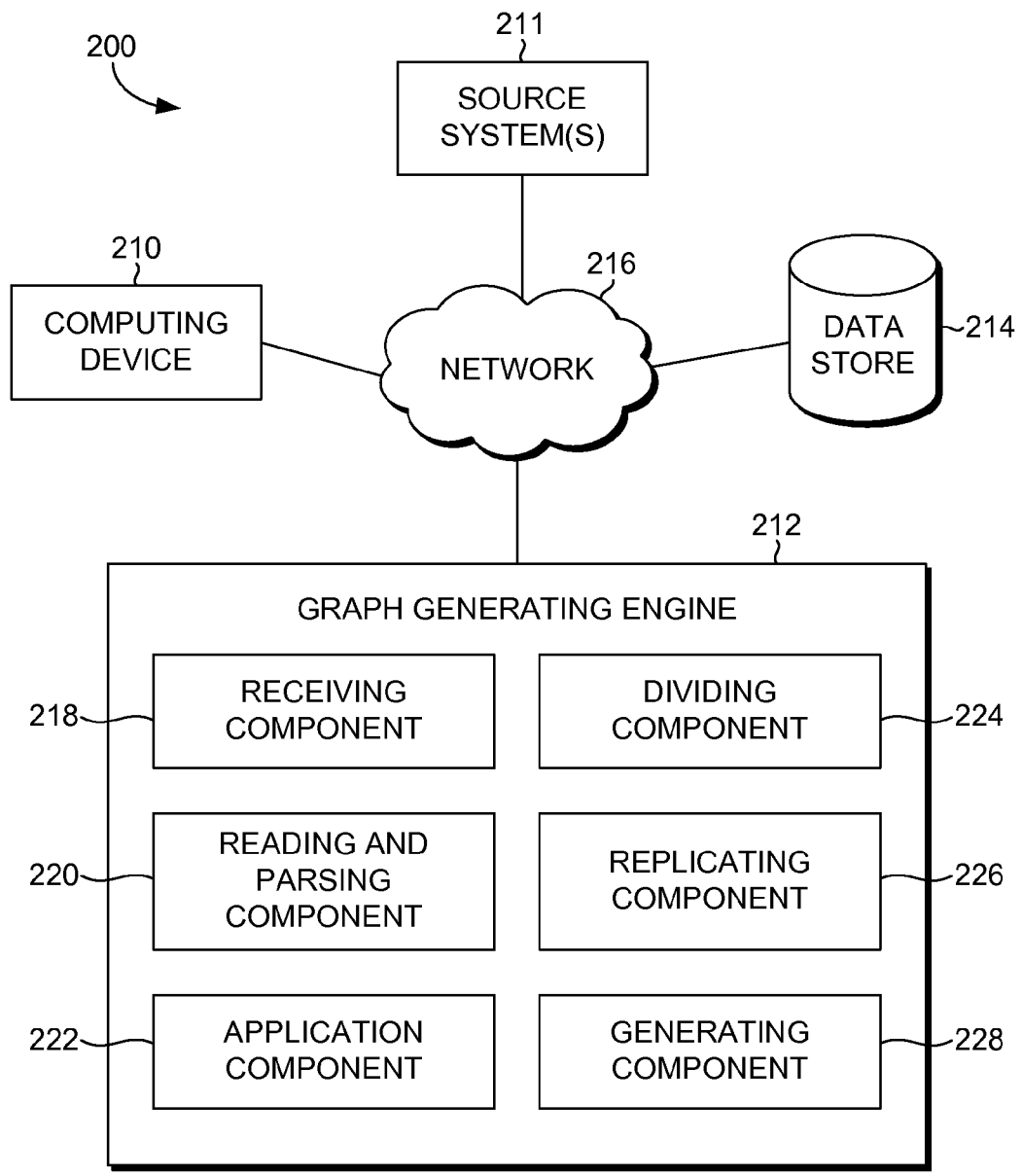
FIG. 2 is a block diagram of an exemplary computing system suitable for generating distributed dataflow graphs, in accordance with an embodiment of the present invention.

Turning now to FIG. 2, a block diagram is illustrated, in accordance with an embodiment of the present invention, showing a system 200 configured to generate a distributed dataflow graph based upon the characteristics of each vertex that comprises the corresponding sequential dataflow graph. Examples of vertices include, but are not limited to, filtering, looking-up, aggregating, joining, merging, unioning, auto-partitioning, hash partitioning, joining, aggregating, top/bottom, sorting, and a combination thereof.

It will be understood and appreciated by those of ordinary skill in the art that the distributed graph generation system 200 shown in FIG. 2 is merely an example of one suitable computing system environment and is not intended to suggest any limitation as to the scope of use or functionality of embodiments of the present invention. Neither should the system 200 be interpreted as having any dependency or requirement related to any single component or combination of components illustrated therein. Further, the system 200 may be provided as a stand-alone product, as part of a software development environment, or any combination thereof.

The system 200 includes one ore more user computing devices 210, one or more source systems 211 (e.g., websites and the like), a graph generating engine 212, and a data store 214 all in communication with one another via a network 216. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The data store 214 is configured to store information related to the generation of distributed dataflow graphs. In various embodiments, such information may include, without limitation, the data elements to be processed, sequential dataflow graphs, resulting distributed dataflow, heuristics that can be applied to the sequential dataflow graph, previously generated distributed dataflow graphs, and the like. In embodiments, the data store 214 is configured to be searchable for one or more of the items stored in association therewith. It will be understood and appreciated by those of ordinary skill in the art that the information stored in the data store 214 may be configurable and may include any information relevant to the generation of distributed dataflow graphs. The content and volume of such information are not intended to limit the scope of embodiments of the present invention in any way. Further, though illustrated as a single, independent component, data store 214 may, in fact, be a plurality of data stores, for instance, a database cluster, portions of which may reside on one or more user computing device 210, the graph generating engine 212, another external computing device (not shown), and/or any combination thereof.

Each of the computing device 210 and the graph generating engine 212 shown in FIG. 2 may be any type of computing device, such as, for example, computing device 100 described above with reference to FIG. 1. By way of example only and not limitation, each of the computing device 210 and the graph generating engine 212 may be a personal computer, desktop computer, laptop computer, handheld device, mobile handset, consumer electronic device, and the like. Additionally, the user computing device 210 may further include a keyboard, keypad, stylus, joystick, and any other input-initiating component that allows a user to provide wired or wireless data to the network 216, e.g., data elements to be processed and warehoused, and the like. It should be noted, however, that the present invention is not limited to implementation on such computing devices, but may be implemented on any of a variety of different types of computing devices within the scope of embodiments hereof.

As shown in FIG. 2, the graph generating engine 212 includes a receiving component 218, a reading and parsing component 220, an application component 222, a dividing component 224, a replicating component 226, and a generating component 228. In some embodiments, one or more of the illustrated components 218, 220, 222, 224, 226, and 228 may be implemented as stand-alone applications. In other embodiments, one or more of the illustrated components 218, 220, 222 224, 226, and 228 may be integrated directly into the operating system of the graph generating engine 212 and/or one or more of the user computing devices 210. It will be understood by those of ordinary skill in the art that the components 218, 220, 222, 224, 226, and 228 illustrated in FIG. 2 are exemplary in nature and in number and should not be construed as limiting. Any number of components may be employed to achieve the desired functionality within the scope of embodiments of the present invention.

The receiving component 218 is configured for receiving processing requests for processing data elements, e.g., sequential data elements, that are to be formed into a sequential dataflow graph and converted to a distributed dataflow graph for more efficient processing of the data elements, as more fully described below. Upon receiving a processing request, for instance, a request for data warehousing or the like, the receiving component 218 is configured to transmit such request, in one embodiment, to data store 214, where the corresponding data elements may be stored. The data elements corresponding to the input request are then returned to the receiving component 218. In this regard, the receiving component 218 is further configured for receiving data elements.

In another embodiment, at least a portion of the data elements is extracted from at least one of a plurality of source systems 211, such as a website, or the like. In this instance, the receiving component 218 receives a request for a data transformation and storage project from a user, for instance, a user associated with the user computing device 210. Upon receiving the request for a data transformation and storage project, the receiving component 218 transmits the request for data elements that are to be transformed and stored to at least one of a plurality of source systems 211 (e.g., websites) and the data elements corresponding to the input request are returned to the receiving component 218. Again, in this regard, the receiving component 218 is further configured for receiving data elements. It will be understood by those of ordinary skill in the art that the illustrated receiving component 218 is able to query one or more data stores, such as, for instance, data store 214, and/or one of a plurality of source systems, e.g., websites, for data elements in response to received data transformation and storage requests. Any and all such variations, and any combination thereof, are contemplated to be within the scope of embodiments hereof.

In embodiments, once a request for data processing is received and the corresponding data elements are retrieved from data store 214 and/or from at least one of a plurality of source systems 211, the data elements are transmitted to the reading and parsing component 220. In this regard, the reading and parsing component 220 is configured for receiving data elements from the receiving component 218 and for forming a sequential dataflow graph there from, the sequential dataflow graph being comprised of vertices and edges. Each vertex represents a data transformation step, which may include, by way of example only, filtering, looking-up, aggregating, joining, merging, unioning, auto-partitioning, merge/join, merge/aggregate, top/bottom, sorting, and any combination thereof. The sequential dataflow graph that is formed by the reading and parsing component 220 is stored, for instance, in association with data store 214, which, in one embodiment, stores the graph as an internal in-memory representation. Internal in-memory representation allows the sequential dataflow graph to be accessible and compatible with various types of languages, such as, but not limited to scripting languages, XML, SQL Server Integration Services (SSIS), and the like.

Once the reading and parsing component 220 has formed a sequential dataflow graph from the data elements, the graph is transmitted to the application component 222 which applies at least one heuristic to the sequential dataflow graph. The application component 222 is configured for applying at least one heuristic to the sequential dataflow graph in order to determine which vertices are capable of being performed multiple times in parallel, and how those vertices can be parallelized. An execution plan is generated by application component 222 based upon the vertices that are found to be capable of being performed multiple times in parallel, and the application component 222 communicates the execution plan to the dividing component 224 along with instructions as to how the sequential dataflow graph is to be divided. In one embodiment, the decision of which heuristic or heuristics to apply to the sequential dataflow graphs is made by the user. One skilled in the art, however, will understand that this can be accomplished in a number of ways within the scope of embodiments hereof, and is not limited to user input.

The dividing component 224 is configured for dividing the sequential dataflow graph into a plurality of subgraphs based upon the previously-determined distributed execution plan generated by the application component 222. In this regard, the dividing component 224 is configured for receiving the sequential dataflow graph (e.g., from application component 222) formed in response to the request for a data warehousing project, or the like. The execution plan communicates to the dividing component 224 as to exactly where the sequential dataflow graph should be divided for optimal performance of the later-formed distributed dataflow graph. For exemplary purposes only, if there are two consecutive vertices in the sequential dataflow graph that are capable of being performed multiple times in parallel, the distributed execution plan may communicate to the dividing component 224 to keep those two vertices together to form a singular subgraph. If, however, there are two consecutive vertices in which one vertex is capable of being performed multiple times in parallel and the other vertex is not (e.g., must be performed sequentially), the execution plan, for instance, may communicate to the dividing component 224 to create two separate subgraphs for the two consecutive vertices.

The replicating component 226 is configured for replicating the subgraphs, formed by the dividing component 224, that is, for replicating the subgraphs that were determined to be capable of being performed multiple times in parallel by the application component 222. In this regard, the replicating component 226 is configured for receiving the subdivided sequential dataflow graph (e.g., from the dividing component 224) and for replicating each subgraph according to one or more factors. These factors include, but are not limited to, available resources, such as the quantity of processors that are available to perform at least one of the vertices, and external constraints, such as the layout of the data elements, the quantity of the data elements that are formed into the sequential dataflow graph, and user input.

The quantity of processors available to perform the processing of data can be a useful factor in determining the optimal quantity of replications required for each vertex in the sequential dataflow graph. In one embodiment, the number of replications, or degree of parallelism, for any one vertex is not greater than the quantity of processors or machines available to perform the data processing. The layout of the data elements includes, but is not limited to, the format of the data elements, the size of the individual files that comprise the data elements, and the like. The quantity or total size of the data elements, in one embodiment, can be a controlling factor in determining the optimal number of replications required for each vertex. For exemplary purposes only, if each processor is capable of processing one gigabyte at once and there are 100 gigabytes to process in total, it would be optimal for a particular subgraph to be replicated 100 times to accommodate the incoming quantity of data elements. As another example, if a vertex comprising a subgraph, such as a distributed sort step, does not have any external constraints and may be replicated as many times as needed, the execution plan may set the number of replications for the distributed sort vertex to be computed as the total quantity of the input data divided by the total memory size of each distributed sort vertex. If desired, a user may input the number of replications to be made for each vertex. In one embodiment of the present invention, the user is able to disregard all of the other factors listed above and input an appropriate number of replications for each vertex. The factors listed above are meant to be exemplary only, and are not exhaustive. It will be understood by one skilled in the art that many other factors could be used to determine the optimal number of replications required for each vertex in order to achieve efficient data processing results.

The generating component 228 is configured for generating a distributed dataflow graph by connecting the replicated subgraphs based on the respective semantics of each vertex. In this regard, the generating component 228 is configured to receive the replicated dataflow graph (e.g., from the replicating component 226) and for appropriately connecting the subgraphs together to form a distributed dataflow graph. Each type of vertex, or data transformation step, requires a specific type of mapping, which determines how the vertices are to be connected. For exemplary purposes only, some vertices require one-to-one mapping (e.g., filtering step), some require one-to-all mapping (e.g., hash partitioning step), some require all-to-one mapping (e.g., merging step), while others require all-to-all mapping (e.g., joining step). It will be understood by one skilled in the art that each type of vertex, or data transformation step, possesses a unique semantic that enables a particular vertex to be connected to the surrounding vertices in a particular manner.

Figure 3:
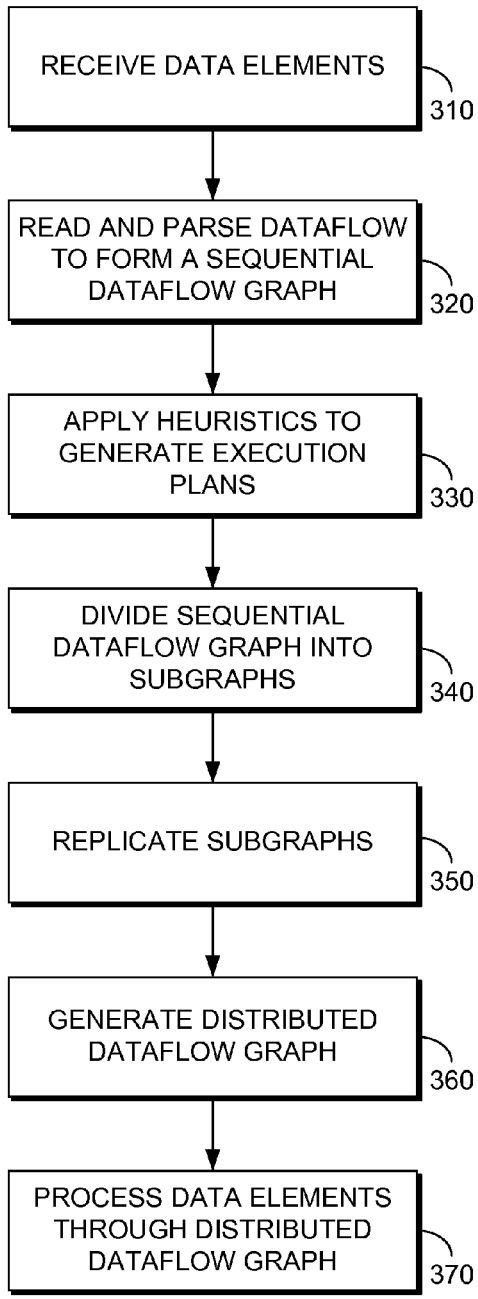
FIG. 3 is a flow diagram showing a method for generating distributed dataflow graphs, in accordance with an embodiment of the present invention.

Turning now to FIG. 3, a flow diagram is illustrated which shows a method 300 for generating a distributed dataflow graph, in accordance with an embodiment of the present invention. Initially, as indicated at block 310, a plurality of data elements are received, e.g., utilizing receiving component 218 of FIG. 2. As previously described, such data elements may be received in response to receipt of a data processing request and subsequent retrieval of the data elements from a data store (e.g., data store 214 of FIG. 2) and/or one or more source systems (e.g., source system(s) 211 of FIG. 2).

Subsequently, the plurality of data elements is read and parsed to form a sequential dataflow graph, as indicated at block 320, e.g., utilizing the reading and parsing component 220 of FIG. 2. The sequential dataflow graph represents business logic of the ETL process, which is a component of any data warehousing or other database storage project. It will be understood by one skilled in the art that sequential dataflow graphs can be represented in one of many ways. In one embodiment, the sequential dataflow graph is represented using a SQL Server Integration Services (SSIS) dataflow component. In other embodiments, the dataflow can be encoded in scripting languages, XML, or any other format that ETL or other associated tools use. In one embodiment, the sequential dataflow graph is a direct acyclic graph (DAG), which does not have any cycles. The graph may be stored, for instance, as an internal in-memory representation so that it is accessible and compatible with any type of language, including, but not limited to, those mentioned above.

Next, as indicated by block 330, heuristics are applied to the sequential dataflow graph to determine which vertices are capable of being performed multiple times in parallel, e.g., utilizing the application component 222 of FIG. 2. At block 330, a distributed execution plan is generated, which is the basis for dividing the sequential dataflow graph into subgraphs as indicated at block 340, e.g., utilizing the dividing component 224 of FIG. 2. The subgraphs are then replicated, as indicated at block 350, e.g., utilizing the replicating component 226 of FIG. 2. Factors according to which the subgraphs may be replicated include, but are not limited to, the quantity of processors that are available to perform at least one of the vertices, the layout of the data elements, the quantity of the data elements that are formed into the sequential dataflow graph, and user input.

Next, as indicated at block 360, a distributed dataflow graph is generated as a result of the connections formed between the replicated subgraphs, e.g., utilizing the generating component 228 of FIG. 2. Lastly, the data elements are processed in accordance with the distributed dataflow graph, as indicated at block 370.

It will be understood by those of ordinary skill in the art that the order of steps shown in the method 300 of FIG. 3 are not meant to limit the scope of the present invention in any way and, in fact, the steps may occur in a variety of different sequences within embodiments hereof. Any and all such variations, and any combination thereof, are contemplated to be within the scope of embodiments of the present invention.

Figure 4:
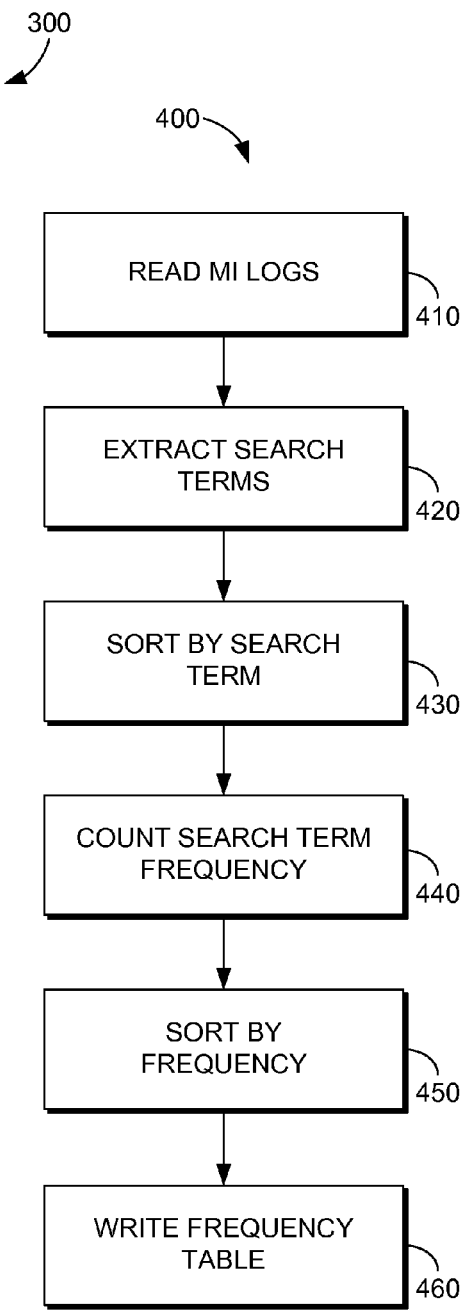
FIG. 4 is an illustrative sequential dataflow graph, in accordance with an embodiment of the present invention, showing six vertices and five edges.

With reference to FIG. 4, an illustrative sequential dataflow graph 400 is shown in accordance with an embodiment of the present invention, showing six vertices and five edges. The illustrated sequential dataflow graph 400 was formed using the incoming data elements by, e.g., utilizing the reading and parsing component 220 of FIG. 2. The six vertices of the illustrative sequential dataflow graph 400 include the data elements "read MI logs" 410, "extract search terms" 420, "sort by search term" 430, "count (e.g., aggregate) search term frequency" 440, "sort by frequency" 450, and "write the frequency table" 460. It will be understood by those of ordinary skill in the art that the order of the vertices and the actual vertices shown in the illustrative sequential dataflow graph 400 of FIG. 4 are not meant to limit the scope of the present invention in any way and, in fact, the vertices may occur in a variety of different sequences within embodiments hereof. Any and all such variations, and any combination thereof, are contemplated to be within the scope of embodiments of the present invention.

Figure 5:
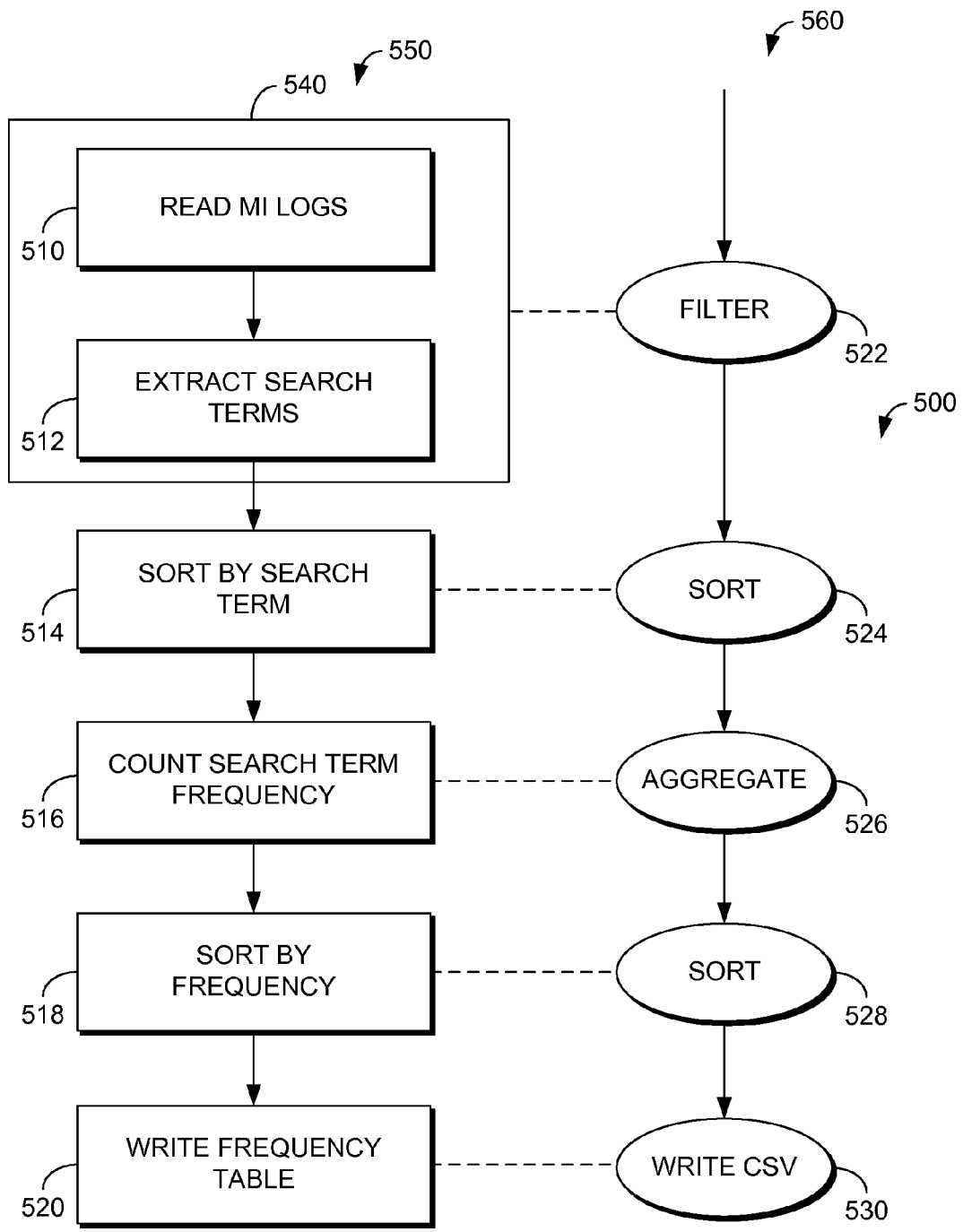
FIG. 5 is an illustrative sequential dataflow graph and subdivided graph, in accordance with an embodiment of the present invention, showing five subgraphs that were divided from the sequential dataflow graph of FIG. 4 based upon the determined plurality of vertices that are capable of being performed multiple times in parallel.

FIG. 5 shows the illustrative sequential dataflow graph of FIG. 4 having vertices grouped as more fully described below, the grouped illustrative sequential dataflow graph being shown generally as reference numeral 550. FIG. 5 additionally shows the grouped sequential dataflow graph 550 divided into subgraphs according to an execution plan, for instance, an execution plan generated by the application component 222 of FIG. 2. The subdivided graph is shown generally as reference numeral 560. As previously described various heuristics, when applied to a sequential dataflow graph, determine which vertices are capable of being performed multiple times in parallel and which must be performed sequentially. An execution plan is generated as a result of the applied heuristics, for example, by the application component 222 of FIG. 2. In this illustrated embodiment, the vertices "read MI logs" 510, "extract search terms" 512, "count search term frequency" 516, and "write frequency table" 520 have been found to be capable of being performed multiple times in parallel, and thus any of these listed vertices that are shown consecutively in the illustrative sequential dataflow graph 550 may be grouped together as a single subgraph. That is, as shown in the illustrative subdivided graph 560, "read MI logs" 510 and "extract search terms" 512 are consecutive vertices that have been grouped together into a single subgraph 540, termed the filter subgraph 522. If the execution plan provides that the "sort by search term" 514 and "sort by frequency" 518 vertices are to be performed sequentially, as is the case with the illustrative sequential dataflow graph 550, the grouped sequential data flow graph 550 will be divided, e.g., utilizing the dividing component 224 of FIG. 2, between vertices 514, 516, 518, and 520. Thus, a total of five subgraphs are provided, as shown in the subdivided graph 560, those being the filter subgraph 522, sort subgraph 524, aggregate subgraph 526, sort subgraph 528, and write CSV subgraph 530.

Figure 6:
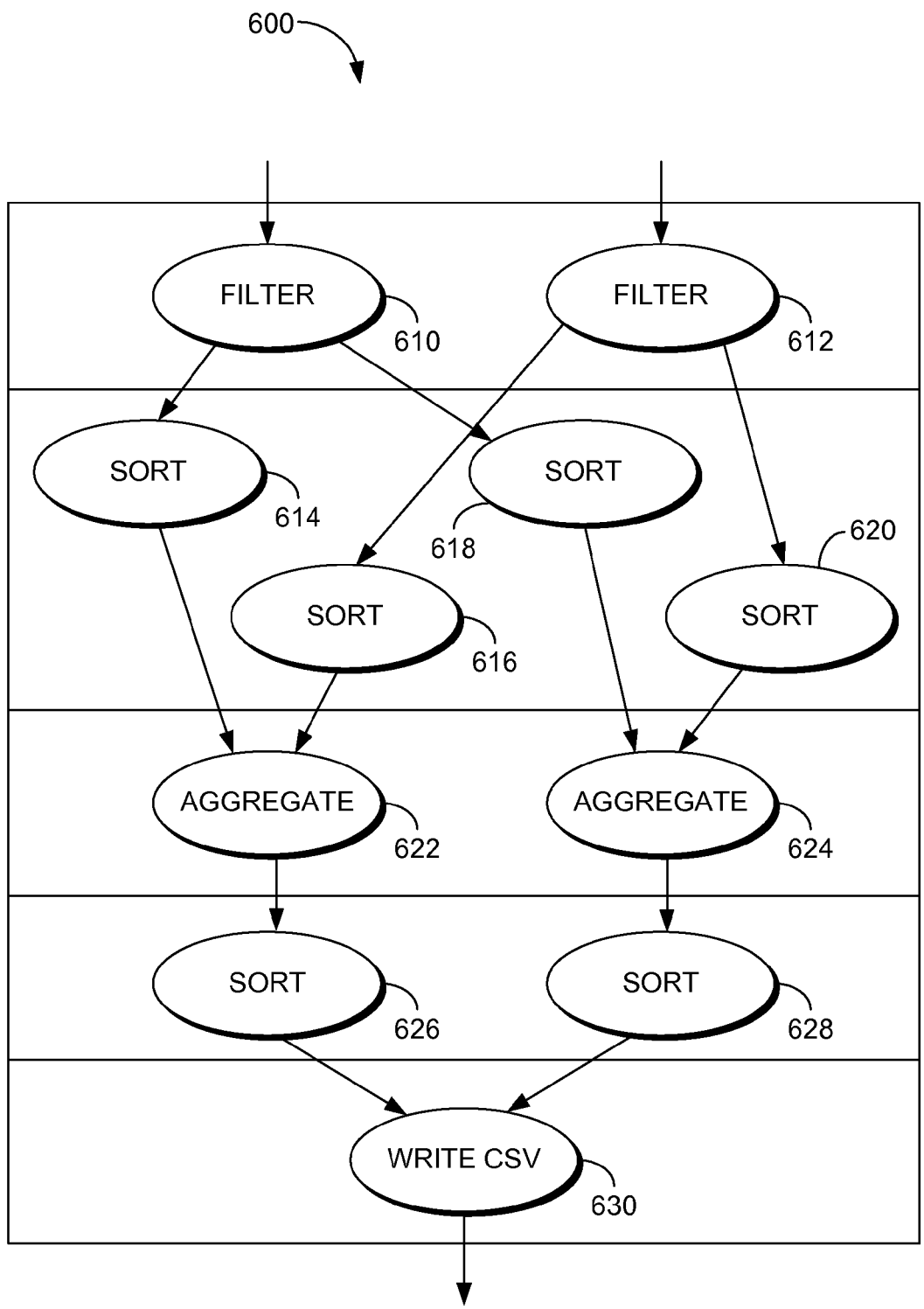
FIG. 6 is an illustrative distributed dataflow graph, in accordance with an embodiment of the present invention, showing the respective number of replications of each of a plurality of subgraphs shown in FIG. 5.

FIG. 6 is an illustrative distributed dataflow graph 600 and is an embodiment of the number of replications made for each vertex and how subgraphs may be connected, for example, by the replicating component 226 and the generating component 228, respectively, of FIG. 2. Distributed dataflow graph 600 illustrates the number of replications made for each subgraph, which is based on at least one of the quantity of processors that are available to perform at least one of the vertices, the layout of the data elements, the quantity of the data elements that are formed into the sequential dataflow graph, and user input.

As mentioned above, the number of replications for the vertices is determined by the semantics of each respective vertex. The nature of the interconnections between different vertices, however, depends on the respective mapping requirements of each vertex, such as one-to-one mapping (e.g., filtering step), one-to-all mapping (e.g., hash partitioning step), all-to-one mapping (e.g., merging step), and all-to-all mapping (e.g., joining step). As shown in the first tier of the illustrative distributed dataflow graph 600, there are two replications (610 and 612) of the filter subgraph 522 of FIG. 5 (e.g., because it was determined, for instance, by the application component 222 of FIG. 2, that there would be two inputs to the distributed dataflow graph). The sort subgraph 524 of FIG. 5, however, has been replicated four times (e.g., as a result of the large data volume). The aggregate subgraph 529 of FIG. 5 is illustrated as being replicated two times, shown as 622 and 624, as is the sort subgraph 528 of FIG. 5, shown as 626 and 628 (e.g., as a result of data reduction during the aggregate step). All data is combined into the write CSV vertex 630, and the result is a much faster and more efficient data processing process.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage memory having computer-executable instructions embodied thereon that, when executed, perform a method for generating distributed dataflow graphs, the method comprising:
   receiving a plurality of data elements;
   reading and parsing the plurality of data elements to form a sequential dataflow graph having a plurality of vertices;
   determining at least one of the plurality of vertices that is capable of being performed multiple times in parallel by applying at least one heuristic to the sequential dataflow;
   determining at least two of the plurality of vertices that must be sequentially performed;
   basing a number of times to replicate the at least one vertex on a number of processors available to perform data processing;
   replicating the at least one vertex the number of times;
   dividing the sequential dataflow graph into a plurality of subgraphs based upon the determined at least one vertex that is capable of being performed multiple times in parallel, wherein one subgraph comprises the at least two of the plurality of vertices that must be sequentially performed;
   determining a quantity of data each of a plurality of available processors can simultaneously process;
   using sizes of the data elements and the quantity of data each of the plurality of available processors can simultaneously process to determine a number of times to replicate each of the plurality of subgraphs;
   replicating the plurality of subgraphs that are determined to be capable of being performed multiple times in parallel the number of times; and
   generating a distributed dataflow graph by connecting the replicated subgraphs.

2. The one or more computer-storage memory of claim 1, wherein the sequential dataflow graph is a direct acyclic graph.

3. The one or more computer-storage memory of claim 1, further comprising processing the plurality of data elements in accordance with the distributed dataflow graph.

4. The one or more computer-storage memory of claim 1, wherein the sequential dataflow graph is comprised of the plurality of vertices and a plurality of edges, wherein each of the plurality of vertices represents a data transformation step, and wherein each of the plurality of edges represents the flow of data elements between the vertices.

5. The one or more computer-storage memory of claim 2, wherein each of the data transformation steps includes at least one of a filtering step, a looking-up step, an aggregating step, a joining step, a merging step, a unioning step, an auto-partitioning step, a top/bottom step, and a sorting step.

6. The one or more computer-storage memory of claim 1, wherein the respective number of replications of each of the plurality of subgraphs depends on at least one available resource, and wherein the at least one available resource comprises a quantity of processors that is capable of performing at least one of the plurality of vertices.

7. The one or more computer-storage memory of claim 1, wherein the respective number of replications of each of the plurality of subgraphs depends on at least one external constraint, and wherein the at least one external constraint comprises a layout of the data elements.

8. The one or more computer-storage memory of claim 1, wherein the respective number of replications of each of the plurality of sub graphs depends on at least one external constraint, and wherein the at least one external constraint comprises a quantity of the plurality of data elements entering each of the plurality of vertices.

9. The one or more computer-storage memory of claim 1, wherein the respective number of replications of each of the plurality of subgraphs depends on at least one external constraint, and wherein the at least one external constraint comprises a user input.

10. The one or more computer-storage memory of claim 1, wherein generating a distributed dataflow graph by connecting the replicated subgraphs is based upon one or more semantics of each vertex.

11. One or more computer storage memory having computer-executable instructions embodied thereon that, when executed, generate distributed dataflow graphs, the system comprising:
    a receiving component that receives a plurality of data elements;
    a reading and parsing component that reads and parses the plurality of data elements to form a sequential dataflow graph having a plurality of vertices;
    an application component that applies at least one heuristic to the sequential dataflow graph to determine at least one of the plurality of vertices that is capable of being performed multiple times in parallel and at least two of the plurality of vertices that must be performed in sequence;
    a dividing component that divides the sequential dataflow graph into a plurality of sub graphs based upon the determined at least one vertex that is capable of being performed multiple times in parallel, the at least two of the plurality of vertices that must be performed in sequence, and how many bytes of data a plurality of available processors can simultaneously process;
    a replicating component that replicates the plurality of subgraphs that are determined to be capable of being performed multiple times in parallel a number of times that is based on how many processors are available and sizes of data elements to be replicated, wherein a respective number of replications of each of the plurality of sub graphs depends on at least one of available resources and external constraints; and
    a generation component that generates a distributed dataflow graph by connecting the replicated subgraphs.

12. The one or more computer-storage memory of claim 11, further comprising processing the plurality of data elements in accordance with the distributed dataflow graph.

13. The one or more computer-storage memory of claim 11, wherein the sequential dataflow graph is comprised of the plurality of vertices and a plurality of edges, wherein each of the plurality of vertices represents a data transformation step, and wherein each of the plurality of edges represents the flow of data elements between the vertices.

14. The one or more computer-storage memory of claim 12, wherein each of the data transformation steps include at least one of a filtering step, a looking-up step, an aggregating step, a joining step, a merging step, a unioning step, an auto-partitioning step, a top/bottom step, and a sorting step.

15. The one or more computer-storage memory of claim 11, wherein the respective number of replications of each of the plurality of subgraphs depends on at least one available resource, and wherein the at least one available resource comprises a quantity of processors that is capable of performing at least one of the plurality of vertices.

16. The one or more computer-storage memory of claim 11, wherein the respective number of replications of each of the plurality of subgraphs depends on at least one external constraint, and wherein the at least one external constraint comprises the layout of the data elements.

17. The one or more computer-storage memory of claim 11, wherein the respective number of replications of each of the plurality of sub graphs depends on at least one external constraint, and wherein the at least one external constraint comprises a quantity of the plurality of data elements entering each of the plurality of vertices.

18. The one or more computer-storage memory of claim 11, wherein the respective number of replications of each of the plurality of subgraphs depends on at least one external constraint, and wherein the at least one external constraint comprises a user input.

19. The one or more computer-storage memory of claim 11, wherein generating a distributed dataflow graph by connecting the replicated subgraphs is based upon one or more semantics of each vertex.

20. A computerized method for processing a plurality of data elements using a distributed dataflow graph, the method comprising:
    receiving a plurality of data elements;
    reading and parsing the plurality of data elements to form a direct acyclic sequential dataflow graph, wherein the direct acyclic sequential dataflow graph is comprised of a plurality of vertices and a plurality of edges, and wherein each of the plurality of vertices represents a data transformation step, and wherein each of the plurality of edges represents the flow of data elements between the vertices;
    applying at least one heuristic to the direct acyclic sequential dataflow graph;
    based on applying the at least one heuristic and availability of one or more processors, determining at least one of the plurality of vertices that is capable of being performed multiple times in parallel;
    generating a distributed execution plan based upon the determined at least one vertex that is capable of being performed multiple times in parallel;
    because a second vertex can be replicated as many times as needed, determining to replicate the second vertex a calculated number of times that is based on a total quantity of input data divided by a total memory size of each of a distributed vertexes;
    dividing the sequential dataflow graph into a plurality of subgraphs based upon the distributed execution plan;
    basing a number of times to replicate the at least one vertex on a number of processors available to perform data processing;
    replicating the at least one vertex the number of times;
    replicating at least one of the plurality of subgraphs a number of times based on a layout associated with the data elements, wherein a respective number of replications of each of the plurality of subgraphs depends on at least one of a quantity of processors that is capable of performing at least one of the plurality of vertices, the layout of the data elements, the quantity of the plurality of data elements entering each of the plurality of vertices, and a user input;

generating a distributed dataflow graph by connecting the replicated subgraphs wherein connecting the replicated subgraphs is based upon a plurality of semantics of each vertex; and processing the plurality of data elements in accordance with the distributed dataflow graph.

\* \* \* \* \*